(12) United States Patent
Nysæther et al.

(10) Patent No.: US 7,606,398 B2
(45) Date of Patent: Oct. 20, 2009

(54) SENSOR FOR MEASUREMENT FOR WET AND DRY FINGERS

(75) Inventors: Jon Nysæther, Oslo (NO); Knut Riisnæs, Oslo (NO); Ingvild Juvkam Dyve, legal representative, Oslo (NO); Ørjan G. Martinsen, Stabekk (NO); Geir Mostad, Oslo (NO); Nicolai W. Christie, Hosle (NO); Rune Pedersen, Heggedal (NO)

(73) Assignee: IDEX ASA, Fornebu (NO)

( * ) Notice: Subject to any disclaimer, the term of this patent is extended or adjusted under 35 U.S.C. 154(b) by 1009 days.

(21) Appl. No.: 10/497,847

(22) PCT Filed: Dec. 6, 2002

(86) PCT No.: PCT/NO02/00465

§ 371 (c)(1),
(2), (4) Date: Nov. 16, 2004

(87) PCT Pub. No.: WO03/049011

PCT Pub. Date: Jun. 12, 2003

(65) Prior Publication Data

US 2005/0069178 A1    Mar. 31, 2005

(30) Foreign Application Priority Data

Dec. 7, 2001   (NO)   .................................. 20016013
May 27, 2002   (NO)   .................................. 20022501

(51) Int. Cl.
    *G06K 9/00*   (2006.01)
    *G06K 9/20*   (2006.01)

(52) U.S. Cl. ....................................... 382/124; 382/312
(58) Field of Classification Search ................. 382/124, 382/312; 257/291, 310, 311, 315–322, 334; 250/208.1
See application file for complete search history.

(56) References Cited

U.S. PATENT DOCUMENTS

| 5,006,749 A * | 4/1991 | White ..................... 310/323.03 |
| 6,906,511 B2 * | 6/2005 | Chaparala .............. 324/207.13 |
| 7,067,046 B2 * | 6/2006 | Schroeder .............. 204/403.01 |
| 2003/0165261 A1 * | 9/2003 | Johansen et al. ............ 382/124 |

FOREIGN PATENT DOCUMENTS

EP   0 789 334 A2   8/1997

(Continued)

OTHER PUBLICATIONS

Diep, T., et al. "Electrostatic Discharge (ESD) Standard Linear & Logic", *Texas Instruments*, (Jan. 2001) SSYA010, 8 pages.

*Primary Examiner*—Kanji Patel
(74) *Attorney, Agent, or Firm*—Rothwell, Figg, Ernst & Manbeck, P.C.

(57) ABSTRACT

A sensor device for performing measurements on an at least partially conductive surface includes a number of conductive structures at or directly below the sensor surface. The conductive structures consist of at least one stimulation or current sink electrode and a number of sensor elements coupled to interrogation electrodes in an electronic circuit for measuring impedance between the electrodes and the stimulation electrode. The sensor device also includes at least one additional clamping electrode positioned in the vicinity of the sensor elements and coupled to a chosen voltage.

20 Claims, 9 Drawing Sheets

FOREIGN PATENT DOCUMENTS

| | | |
|---|---|---|
| EP | 0 902 387 A2 | 3/1999 |
| EP | 1 017 009 A2 | 5/2000 |
| JP | 5-309082 | 11/1993 |
| JP | 11-318864 | 11/1999 |
| JP | 2001-141411 | 5/2001 |
| NO | 304766 B1 | 12/1998 |
| NO | 307065 B1 | 8/1999 |
| NO | 20003003 | 6/2000 |
| WO | WO 98/58342 A1 | 12/1998 |
| WO | 99/45496 | 9/1999 |
| WO | WO 99/43258 A1 | 9/1999 |
| WO | WO 01/94902 A2 | 12/2001 |
| WO | WO 01/94902 A3 | 12/2001 |
| WO | WO 01/99036 A2 | 12/2001 |

\* cited by examiner

SENSOR FOR MEASUREMENT FOR WET AND DRY FINGERS

CROSS REFERENCE TO RELATED APPLICATIONS

This application is a 35 U.S.C. § 371 National Phase Entry Application from PCT/NO02/00465, filed Dec. 6, 2002, and designating the U.S.

BACKGROUND OF THE INVENTION

1. Field of the Invention

This invention relates to sensor device for performing measurements on an at least partially conductive surface, specially a sensor geometry to facilitate AC capacitive fingerprint measurements on wet and dry fingers.

2. Description of the Related Art

AC capacitive fingerprint sensors are known e.g. firm international patent applicaton WO 98/58342. These sensors utilize an array of capacitive sensor elements (sensor pads) to capture a fingerprint image from a finger which is held onto or pulled across the sensor surface. Capacitive fingerprint sensors roughly divide into two categories: matrix sensors, where the fingerprint is placed onto a two-dimensional sensor surface, and scanners or sweep sensors, where the user is required to pull his or her finger across the sensor to capture an image. An alternative linear type sensor is described U.S. Pat. No. 6,289,114, this does not, however, describe in any detail how the capacitance is measured.

Each capacitive sensor element normally consists of a conductive pad covered by a dielectric material (sensor dielectric) with a thickness ranging from around 1 µm to around 50 µm. When a ridge is present above a sensor element, the conducting skin we be in close contact with the sensor surface, and the capacitance between finger and sensor pad is determined mainly by the thickness and dielectric properties of the sensor dielectric. When a valley is present above the sensor element, there will be an air gap between the finger surface and the sensor surface, resulting in a much lower capacitance. By converting said capacitance to a voltage or current signal that can be amplified and further processed or digitalized, it will therefore be possible to distinguish a ridge from a valley, and consequently to build up a grayscale or black-white image of the ridge/valley pattern across the fingerprint.

Another example of such a concept is shown in WO 01/99035, WO 01/99036 and WO 01/94902, which show an the constructions and operation of a AC capacitive sweep sensor. This sensor is equipped with a so-called drive electrode or stimulus electrode for stimulating the finger with an AC signal. The stimulus electrode is located aside the sensor elements. In Norwegian application NO 2002 1031 (WO 03/075210) an alternative concept is described in which the stimulation electrode is grounded while the varying current or voltage is provided through the sensor elements.

One problem for capacitive fingerprint sensors is that the finger conductivity (both resistive and AC capacitive) vary strongly with the humidity of the finger. For dry fingers, the result may be that the outer part of the skin (stratum corneum) has a higher impedance (lower capacitance) than the sensor dielectric, so that the combined series capacitance is dominated by the finger impedance. This ridge may then seem more like a valley than like a ridge.

Another problem may be that the ridge itself is not perfectly smooth, resulting in ridge areas where there is a shallow air gap between the ridge and the sensor surface. Also in this case this past of the ridge may be mistaken for a valley, especially if the sensor dielectric is very thin (comparable to the depth of the air gap). It therefore necessary to find a means of amplifying the faint signal from dry fingers, and also be able to separate the "false" shallow valleys from the real valleys.

For wet fingers, where water or saline (sweat) fill the valleys, the problem is mainly that the saline is even more conductive than the stem corneum. With the described capacitive measuring technique this gives a high signal for both valleys and ridges, so that it is difficult to separate the two. When converted to a digital image of the finger, the result may be a low-contrast "inverted" image where the well-conducting valley appear as "black" and the slightly less conductive ridges appear as "dark grey". Such an image does not easily lend itself to software algorithms aimed at fingerprint recognition.

Norwegian patent application 2002 1031 shows another principle where the outer electrode is grounded, and where the AC signal is applied to the sensor pads by drive circuits located elsewhere in the sensor module. This principle however has the same drawback: Sweat-filled valleys will give approximately the same signal as a fingerprint ridge, and the two will be practically impossible to distinguish.

SUMMARY OF THE INVENTION

It is thus an object of this invention to provide a sensor which avoids the abovementioned problems and relates to a method for assuring adequate signal levels and image quality for both wet and dry fingers, despite these large differences in conductivity. This is obtained by a sensor as stated above and which is characterized in that it comprises a number of conductive structures at or directly below the sensor surface, said conductive structures consisting of at least one stimulation or current sink electrode and a number of sensor elements coupled to interrogation electrodes in an electronic circuit for measuring impedance between the electrodes and said at least one stimulus electrode, the sensor device also comprising at least one additional electrode being positioned in the vicinity of said sensor elements and being coupled to a chosen voltage.

BRIEF DESCRIPTION OF THE DRAWINGS

The method according to the invention is illustrated in the accompanying drawings, illustrating the invention by way of examples.

DETAILED DESCRIPTION OF EMBODIMENTS OF THE INVENTION

Figure 1:
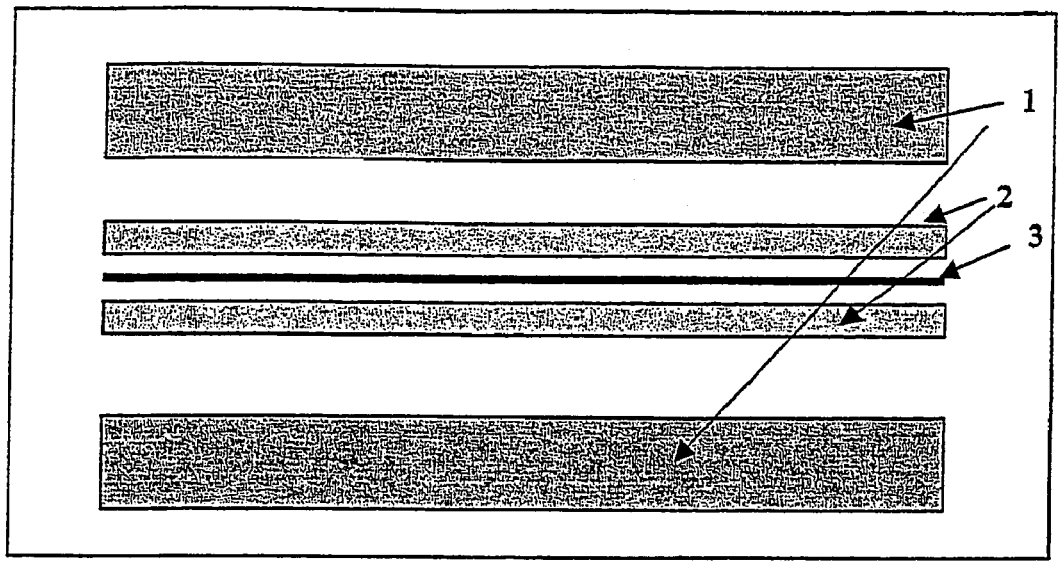
FIG. 1 Schematic drawing of possible electrode configuration on linear sensor surface according to the invention, featuring a clamping electrode.

FIG. 1 describes an embodiment of the invention comprising a sensor surface equipped with a number of sensor pads 3 for capacitance measurements, and at least two electrodes 1,2 that may either be located on the sensor surface or be external to this. The illustrated fingerprint sensor thus preferably is an essentially linear sensor array as described in the abovementioned international patent applications, especially WO 01/94902, and may, in addition to the array 3 of sensor elements, include velocity sensors (not shown in the drawings) for measuring the velocity of the finger and thus together with the measured characteristic of the finger surface reconstitute an image of the fingerprint. Other methods for reconstituting the image may, however, also be contemplated, e.g. as in the abovementioned U.S. Pat. No. 6,289,114, in which overlapping images from several sensor lines are used to reconstitute the image.

In the drawings one electrode, the outer electrode or drive electrode 1, also called "stimulus electrode", may be either grounded, as in abovementioned 2002.1031, while a varying voltage or current is provided at the sensor element, or carry an AC signal as in abovementioned WO 01/94902. This electrode 1 serves as one of the main terminals for the AC current that passes through the finger and the sensor elements. It can therefore alternatively be termed a current "sink" or "source" electrode. The outer electrode 1 can be placed at any distance from the sensor pads 3 as long as it has contact with the finger during measurements. It may also consist of several individual electrodes. It may optionally be covered with an insulating material.

Figure 2:
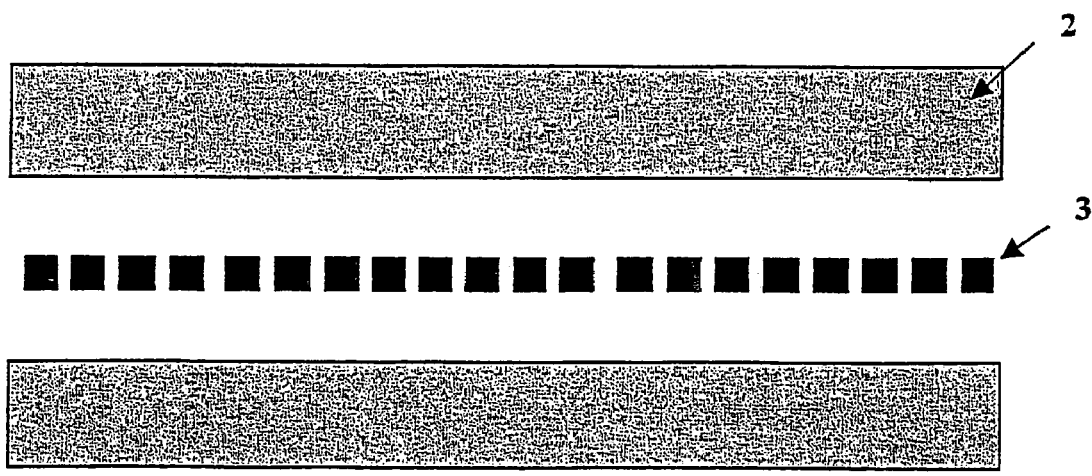
FIG. 2 Detail of possible electrode configuration around the sensor pad area.

The sensor in FIG. 1 further contains one or more local electrodes 2 being situated very close to the sensor pads 3, the local electrodes 2 acting as clamping electrodes and thus also called "clamping electrode", the reasons for which will be evident in the functional description below. The distance between the local or clamping electrode 2 and the sensor elements 3 should typically be lower than the width of a fingerprint ridge or valley, e.g in the range of 20-200 µm. FIG. 2 illustrates a detail of the structure with a number of sensor elements 3 between two clamping electrodes 2.

Figure 3:
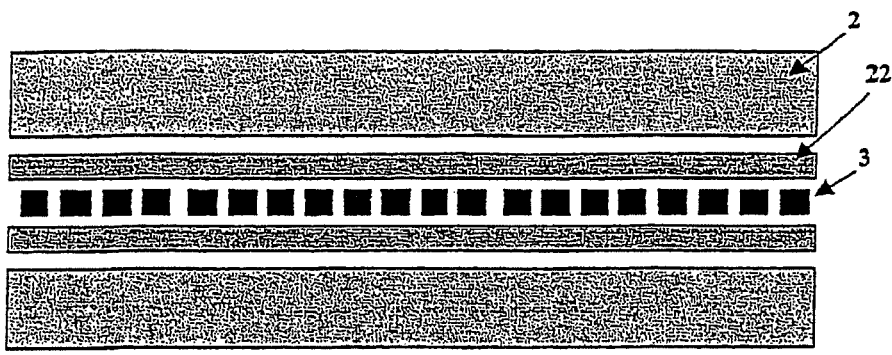
FIG. 3 Detail of an alternative possible electrode configuration around pad area with additional innermost electrode.

FIG. 3 illustrates an alternative embodiment comprising an additional, inner electrode 22, the purpose of which will be described below.

Figure 4:
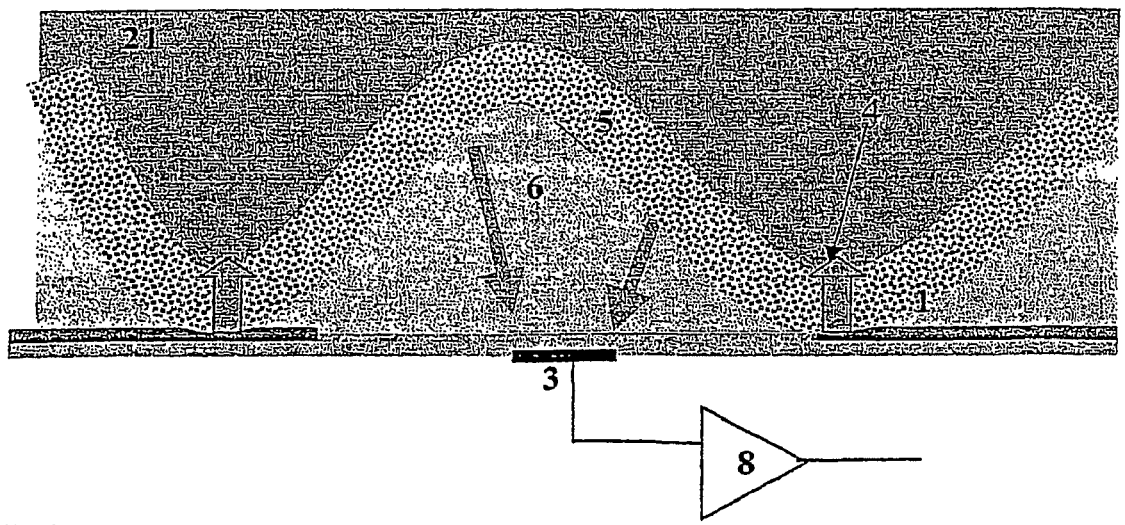
FIG. 4 Current flow in finger with sweat-filled valleys—sensor without clamping electrode. The current from the finger flows to the sensor pad.
Figure 5:
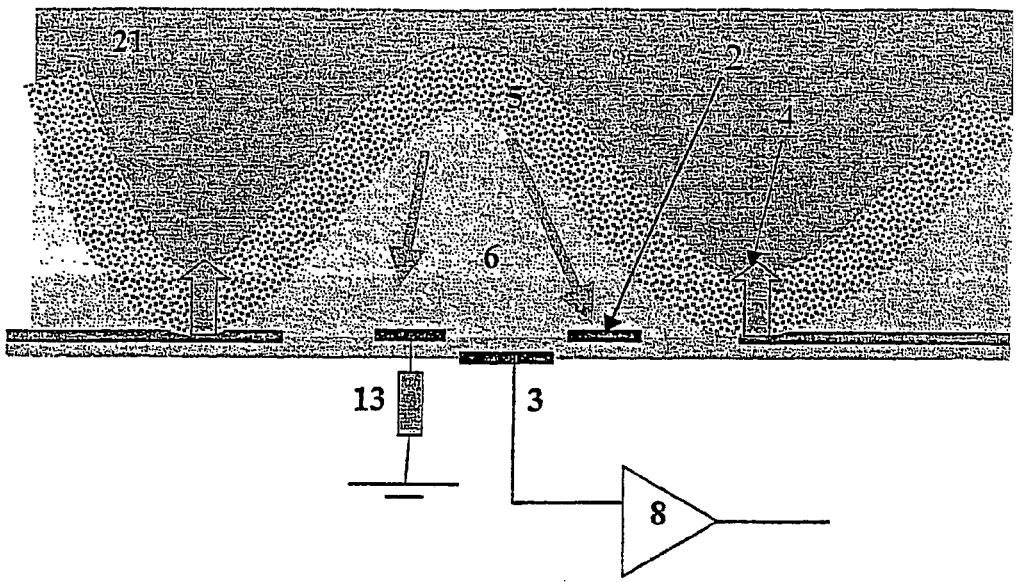
FIG. 5 Current flow in finger with sweat-filled valleys—the current from the finger flows to the clamped local electrode instead of to the sensor pad.
Figure 6:
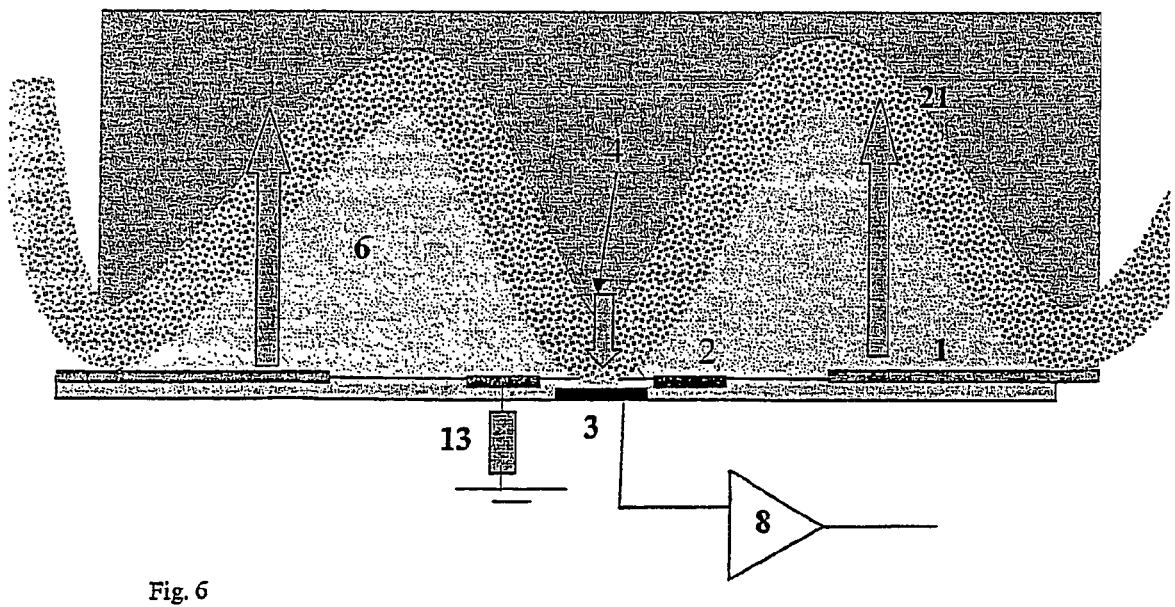
FIG. 6 Current flow for finger with sweat-filled valleys when there is a ridge directly above the sensor pad. The ridge inhibits the "short-circuiting" from the local electrode.

FIGS. 4, 5 and 6 illustrates the current flow through the finger in three different sensor assemblies, FIG. 4 illustrating the current flow in the prior art sensor described in the abovementioned WO 01/94902.

Referring to FIG. 5 showing a mode of operation in which the local clamping electrode 2 is stimulated with an AC voltage, for instance with the same frequency, phase and amplitude as the drive voltage. The current through the finger from this electrode will then give rise to a "constrictional" current through the stratum corneum of the finger 5. This will in turn create a "local" current path between the resulting drive ring constituted by the clamping electrodes 2 and the sensor pad 3, minimizing the impedance from the stimulus electrode 1 to sensor pads 3, and be advantageous both for wet and dry fingers.

For dry fingers, this assures a higher coupling from the drive electrode to the sensor pad, which gives a higher signal.

For wet fingers, such a local drive ring 2 will concentrate the current in the less conducting stratum corneum, so that a significant and detectable voltage drop may be induced here. This voltage drop will not be as pronounced for a saline-filled valley where the conductivity is higher. The result is still an inverted image, but where the contrast between sweat-filled valleys and ridges has been significantly increased. The local drive electrode may also be buried below a dielectric layer.

The abovementioned method can be further improved by adding an array of "inverting" capacitors 26 (FIG. 11), each coupled to one of the sensor pads. By sending an AC voltage with appropriate amplitude and inverted phase (relative to the drive voltage) onto this capacitor, the sensor will give out an inverted signal where well-conducting areas of the finger give a low signal and "isolating" areas (e.g air pockets) give high readings. For wet fingers (valleys filled with saline) this will result in an image where the well-conducting saline-filled valleys appear as nearly white and the somewhat less conductive ridges areas appear as light grey. By increasing the analogue amplification of these signals the contrast of this image will be increased. With this technique we may thus obtain a "right reading" (twice inverted) image also for wet fingers (ridges black, valleys light).

The inverted capacitor technique may also be combined with the use of a multi-frequency drive signal, where the inverted signal contain only some of the frequencies. By appropriate and well-known frequency discriminating signal conditioning it will then be possible to get out both the inverted and the non-inverted image. By combining the information from these two pictures, the actual finger pattern can be determined with a larger confidence.

To be able to use the abovementioned method efficiently, there must be a means for detecting which areas of the picture are sweaty, i.e to determine in which areas it is necessary to use the inverted image to identify ridges and valleys. These requirements may in some cases be difficult to fulfill without using an excessive amount of processing resources.

Another aim of this invention is therefore to suggest an alternative capacitive reading principle where sweat-filledvalleys give rise to approximately the same sign levels as air-filled valleys, and where both valley types have a significant signal contrast to fingerprint ridges.

This can be accomplished by keeping the local electrode at another voltage than the drive electrode. For the sensor described in the figures, this can e.g. be accomplished by coupling the local electrode 2 to a DC potential, either directly or through an impedance 13. For fingerprint valleys filled with sweat or other well-conducting materials, the potential on the local electrode will now "clamp" the sensor pad signal to ground, i.e to a level similar to the signal level from an air-filled valley. For the sensor described in the abovementioned Norwegian application 2002.1031 the electrode could for instance be coupled to an AC voltage with appropriate amplitude.

Figure 7:
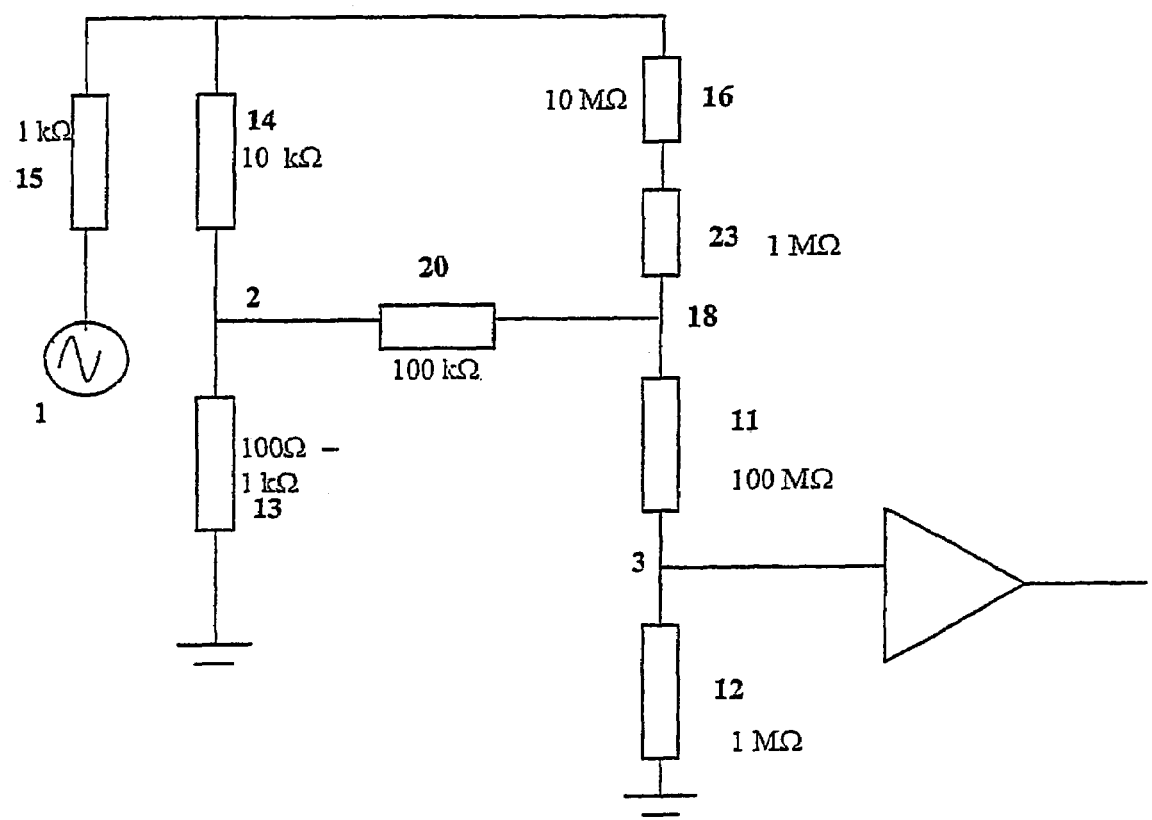
FIG. 7 Electrical model of finger/sensor in the vincinity of a sensor element when there is a sweat-filled valley directly above the sensor pad. The clamping electrode 2 is coupled to ground through a impedance 13 of 100-1000 Ohms.

Let us now consider a case where a sweat-filled valley 6 covers both the sensor pad 3 and a part of the local electrode 2, where the drive electrode 1 stimulates the finger with an AC potential and where the local electrode 2 is coupled to a fixed potential, e.g. ground. FIG. 7 shows an equivalent circuit of the complete measuring system consisting of the electrodes 1 and 2, a sensor pad 3 and the finger. The model further includes a voltage amplifier 8 and a network of impedances (mainly capacitors), including the impedance 16 through the stratum corneum (SC) just above the sensor pad, the impedance 11 through the sensor dielectric, a shunt impedance 12 to ground (for voltage division purposes) and the clamping impedance 13. The impedances 20 and 23 are related to the coupling from the point 18 at the sensor surface just above the sensor pad to the local electrode 2 and to the bottom of the sweat-filled valley 6, respectively. The impedances 15 and 14 are related to coupling of AC voltage into and out of the finger, respectively. The figure also shows coarsely estimated values for each of the impedances involved (with impedance absolute value expressed in Ohms at an AC frequency of 100 kHz). As shown by the circuit diagrams there is an impedance of around 10 MOhms from the drive electrode 1 through the finger to the point 18 just above the sensor pad. This impedance is mainly related to capacitive impedance through the SC layer 5, and the impedance through the inner part of the finger 21 (living skin) is assumed to be negligible.

When choosing the value of the impedance 13 it is important the resulting voltage of the local electrode differs significantly from the voltage of the drive electrode itself. Otherwise the signal contrast between ridges and sweat-filled valleys may become too low. With this respect it will often be advantageous to choose an impedance 13 with a relatively low magnitude, e.g in the range of 100 Ohms to 1 kOhm. However, a too low impedance may in some cases lead to an excessive current consumption, and the proper value must be chosen also with this aspect in mind.

Because the AC conductivity of the saline sweat is much higher than that of the SC (by 1-2 orders of magnitude), the coupling from the local electrode 2 through the impedance 20 is comparably higher, so that point 18 is efficiently "short-circuited" across to the grounded local electrode 2. The voltage on the surface of the sensor, and hence on the sensor pad 3, will then be pulled down or "clamped" to the ground potential, so that the sensor element gives a "low" reading. Another way of looking at this is that the AC current from the finger through the sweat-filled valley will flow directly to the local electrode rather than through the dielectric and down to the sensor pad. This implies that the measuring current through the impedances 11 and 12 is cut off and a low reading is obtained. A schematic drawing of how the currents flow is shown in FIG. 5. For comparison, FIG. 4 shows the situation when there is no clamped local electrode present.

Figure 8:
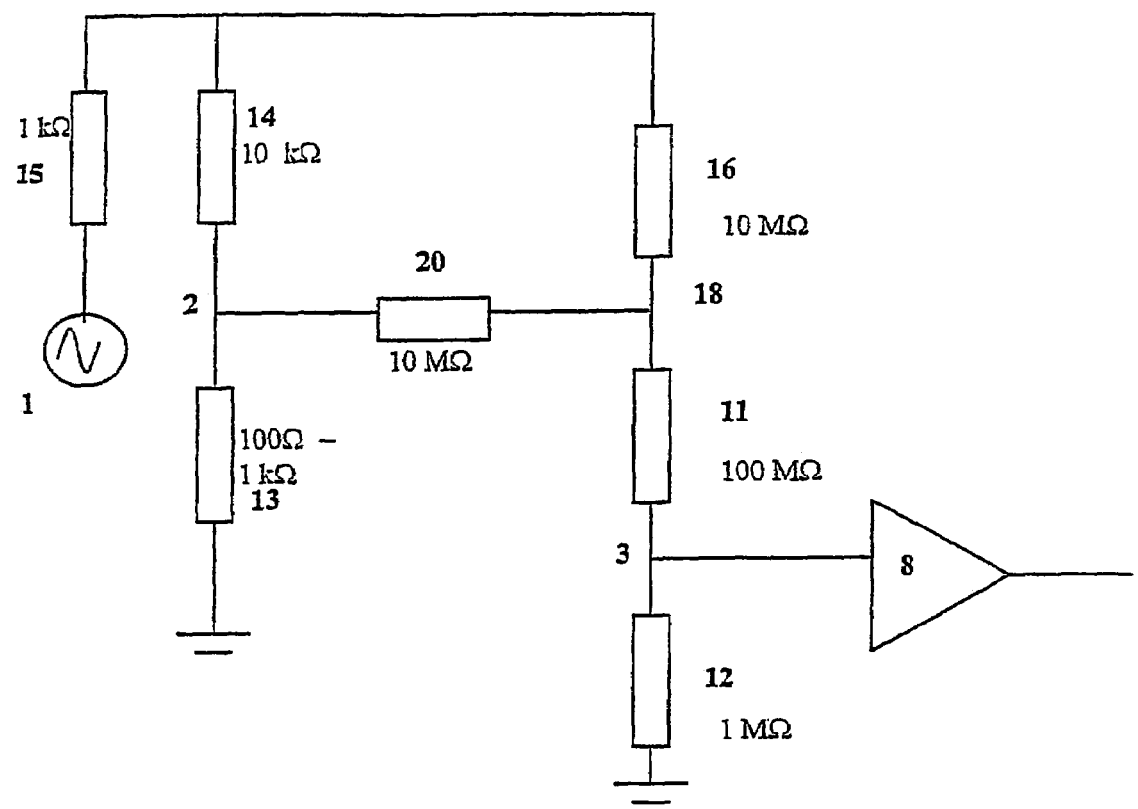
FIG. 8 Electrical model of finger/sensor in the vincinity of a sensor element when there is a ridge directly above the sensor pad and when the valleys of the fingerprint are filled with sweat. The clamping electrode 2 is coupled to ground through a impedance 13 of 100-1000 Ohms.

On the contrary, consider a case when the valleys 6 are filled with sweat, but where a ridge 4 covers the sensor pad 3. The corresponding electrical model is shown in FIG. 8. As the SC 5 is not as conductive as sweat or water, the impedance 20 between the local electrode 2 and the point 18 will be much higher and comparable to the impedance 16 to the drive electrode. This means that the voltage at the point 18 will lie approximately midway between the drive voltage and ground. This gives rise to a significant signal which is typical of a dry finger "ridge", although with a somewhat lower amplitude. FIG. 6 shows how the currents flow when a ridge is present above the sensor element.

In other words, by using a local clamping electrode 2 tied to a fixed potential, the contrast between a sweat-filled valley 6 and a ridge 4 can be strongly increased relative to the situation when no such local electrode is present. In addition, a valley will be associated with a low reading and a ridge with a high reading regardless of whether the valley is filled with sweat or air, so that no extra image-processing, e.g inverting, will be necessary to distinguish the ridges from the valleys.

One disadvantage with the proposed "signal clamping" is that it (because of the finite value of the impedance 20) may be difficult to clamp the signal completely to "zero", and so there will usually be a significant signal even in case of a sweat-filled valley. This means that valleys appear as "light gray" instead of white, and such a "valley offset" may be undesired on a image processing point of view. This effect can however be countered by coupling the local electrode 2 to an "inverted" AC voltage (i.e an AC voltage 180 deg out of phase) rather than to a DC potential. If the amplitude of the inverted voltage is correctly tailored relative to the impedance 20 to the clamping electrode, it may be possible to bring the valley reading down to a nearly "white" level, so that the "humidity-dependent" valley offset is minimized.

Figure 9:
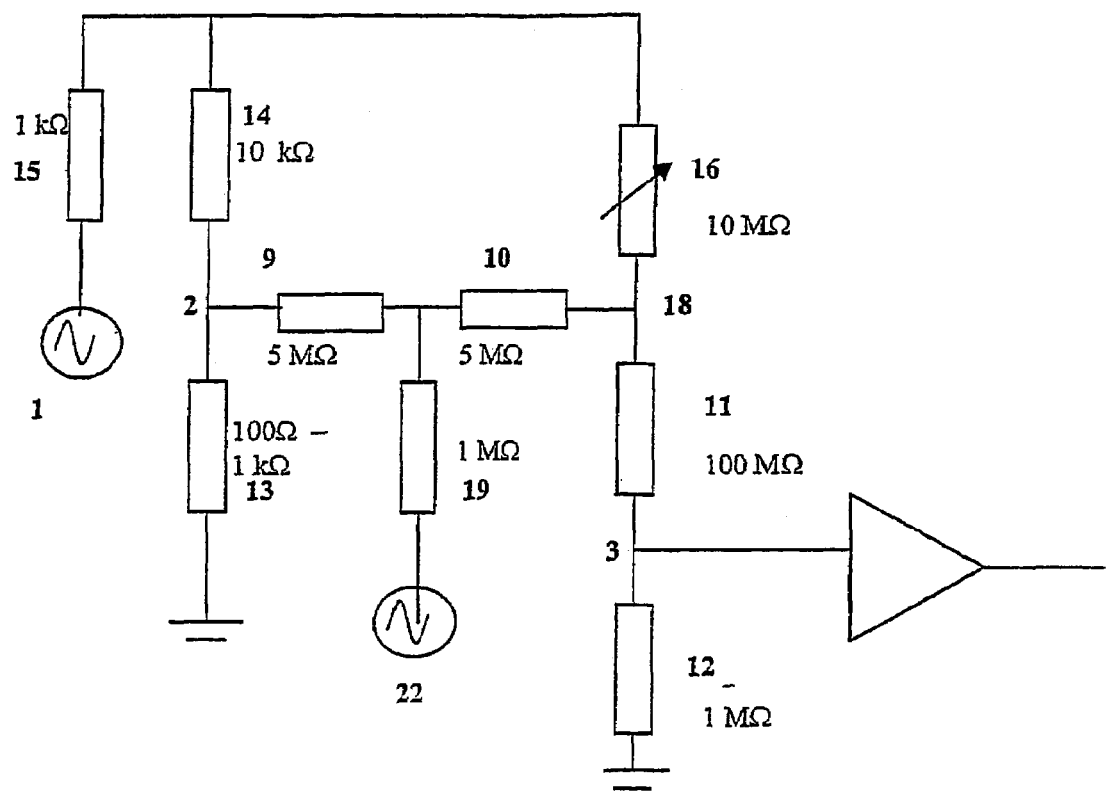
FIG. 9 Electrical model of finger/sensor in the vincinity of a sensor element when there is a ridge directly above the sensor pad and when the valleys of the fingerprint are filled with sweat. The innermost electrode 22 is at drive electrode potential.
Figure 10:
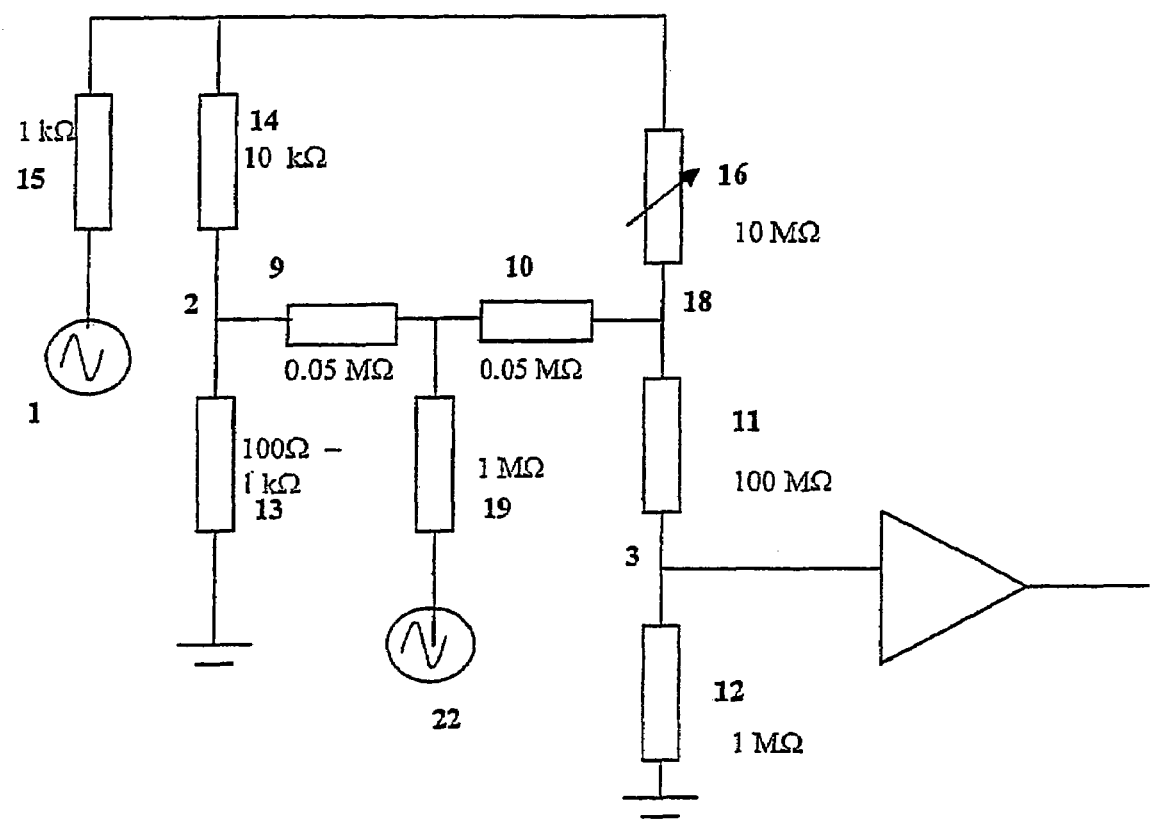
FIG. 10 Electrical model of finger/sensor in the vicinity of a sensor element when there is a sweat-filled valley directly above the sensor pad. The innermost electrode 22 is at drive electrode potential.

Clamping with an inverted voltage will however reduce the signal significantly also for the ridge and not only for the valley. To counter this effect, is possible to add a third "inner" electrode 22, as illustrated in FIG. 3, between the local clamping electrode 2 and the sensor pad 3. This "inner" electrode, being even more "local" than the local electrode, should have the same or a similar voltage to the drive voltage, i.e a voltage corresponding to a high (ridge) reading. The effect of the inner electrode 22 is thus to compensate for the clamping effect of the local electrode 2 by stimulating a fingerprint ridge 4 with a signal or voltage corresponding to a ridge reading. However, for the clamping to work properly, this stimulation must be suppressed when there is a humidity-filled valley 6 above the pad. This can be accomplished by tailoring the impedance 19. When a sweat-filled valley is present, the impedance between the innermost electrode 22 and the point 18 (series coupling of 9 and 10) should be significantly larger than the series coupling of 9 and 10, i.e the impedance between the clamping electrode 2 and the point 18, so that clamping dominates. When there is a ridge above the sensor pad, the situation should be turned around so that the former impedance (19 and 10 in series) is smaller than or at least comparable to the latter (9 and 10 in series). FIGS. 9 and 10 show an electrical model of the structure when there is a ridge and a valley above the pad, respectively. These figures also show an example of how the value of 19 can be chosen to fulfill the described requirements.

There are several ways of achieving such a value of 19 in practice, e.g by making the inner electrode smaller than the local electrode, by covering it by a thin dielectric material, or by a combination of both.

In summary, by coupling the clamping electrode 2 to an "inverted" voltage relative to the drive voltage (for instance inverted with respect to the "zero reading" voltage), by tailoring the amplitude of this inverted voltage and combining it with an "inner" electrode 22, as illustrated in FIG. 3. The inner electrode 22 may be powered with the drive electrode voltage, and may be possible to tailor the signal so that a humid finger gives a relatively high reading (comparable to the reading for a dry ridge) when there is a ridge present and a reading close to zero for a sweat-filled valley.

Whether an inverted voltage or an inner electrode is used is, however, also dependent on if the grounded clamping electrode 2 alone can obtain a sufficient contrast, as the extra elements will add complexity to the device.

In an alternative embodiment of the invention, the inner electrode 22 may be the only source of "drive voltage", thus eliminating the need for the outer electrode 1 completely. To assure full flexibility, the outer electrode may still be kept with a possibility to turn it on or off depending on the conditions of the finger.

It may also be possible to have two local electrodes, one on each side of a sensor element. In a certain mode of operation a voltage difference (AC or DC) can be applied between these electrodes. If one sensor element now consists of two separate metal pads separated in the distance between the two local electrodes, and by measuring the differential voltage between the two pads, it may be possible to perform a "four electrode measurement" of the impedance of the skin, water or air directly above the element. This measurement will give significantly different results in the three cases, making it easy to separate between the three.

In general, all electrodes may be equipped with a possibility to be turned active or inactive, that is the sensor may include programmable switches so that the electrodes may be programmed to either have a specific voltage or be left to "float" with a high impedance coupling to other potentials. The decision whether an electrode should be turned on or off may for instance be based on measurement on specific finger characteristics, e.g on the obtained contrast during the first part of the measurement, or on measurements of finger conductivity. The electrodes may also be switched on and off several times during fingerprint acquisition to obtain more information or "multiple" images that can be combined to give a more robust interpretation of the fingerprint ridge/valley pattern.

Even with a combination of local and innermost electrodes as described above, a thin sweat film which is present on the surface and which is not completely displaced by the ridges may give rise to an unwanted, direct and low impedance coupling between the clamping electrode and the sensor pad. To eliminate or minimize the risk for such bridging, it may be possible to add narrow, topological structures, e.g ridges, between the clamping electrode and the sensor pad. The purpose of the ridge structures, which are preferably made of a isolating or low-conductive material, is to split up the thin conductive film (e.g saline) underneath the ridge, so that the low impedance current path is broken. The ridges must still be so low that a coupling through the much thicker sweat in a valley is assured. The height of the ridge structures may for instance be 0.5-20 μm. If this electrode can be made with a suitable height, the inner electrode may for instance function as a such a ridge structure. Because the ridge in this case is coupled to a specific potential, it does not have to be isolating or low-conductive.

Figure 12:
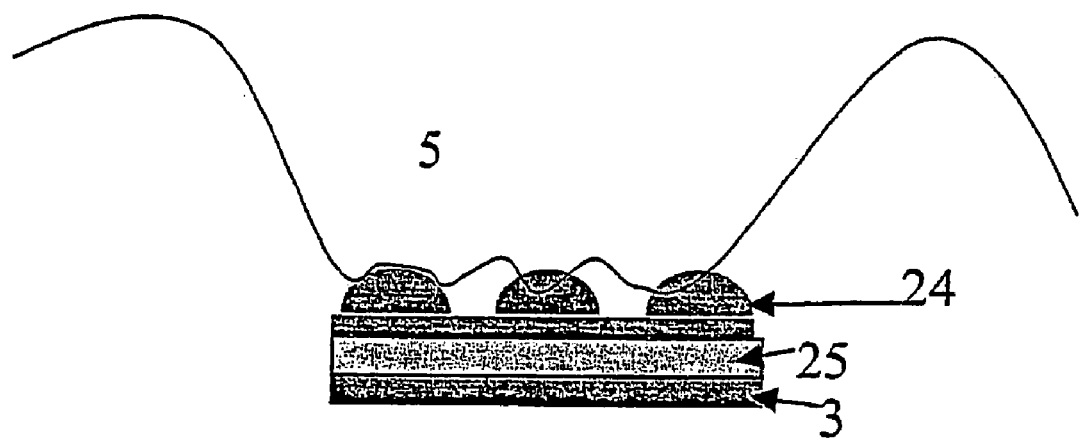
FIG. 12 Illustrates the principle of having a conductive, patterned "topology" 24 ontop the sensor pad 4 to increase the contact area between the sensor pad and for instance the bottoms of the "local" valleys on a fingerprint ridge.

To enhance the performance for dry fingers, a topological pattern 24 of conductive material may be fabricated ontop of the dielectric of each sensor element (FIG. 12). The function of such a pattern is to assure adequate contact between the finger surface and the sensor surface across a larger part of each ridge, reducing the problem with "shallow" air gaps. Alternatively, the pattern may be conductive and covered by a dielectric, or purely dielectric in itself.

The topological pattern 24 may have many forms depending on the size of the sensor pads and the typical height distribution of a finger ridge. It may for instance have the form of one or more segments of a sphere, but it may also have the form of a layered, "stairway" structure.

Figure 13:
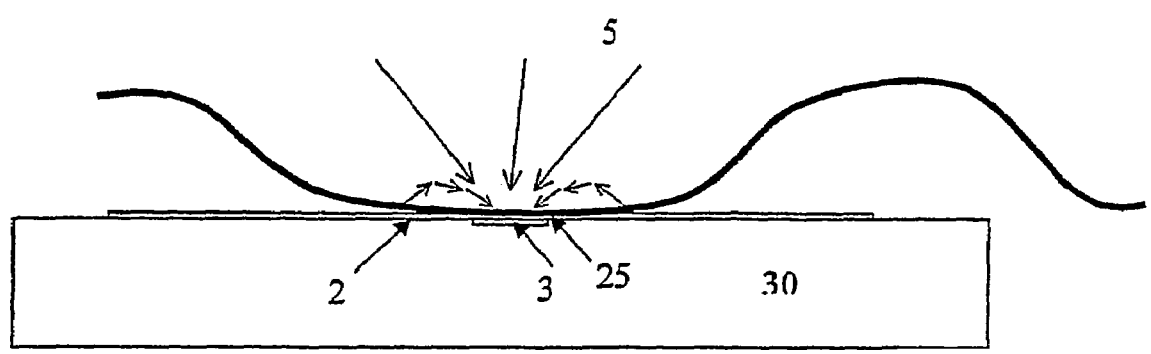
FIG. 13 shows the "local" electrode 2 at drive potential to create a local current path from drive electrode to the sensor pad 3 as well as a "constrictional" effect in the cut path from the electrical AC potential inside the finger. The current paths are indicated by arrows.

In FIGS. 12 and 13 the conductors, ie the stimulation electrode, clamping electrode and sensor elements positioned on a substrate 30. The sensor elements may also be equipped with a pad of conducting material 24 on top of the sensor dielectric 25 above each pad 3. In case of dry fingers with only partly contact in the ridge areas, the function of this pad is to spread the signal from small contact areas out across the sensor dielectric, to increase the coupling to the sensor pad through the dielectric. Alternatively, this pad may be covered by a very thin dielectric material for wear protection.

Figure 14:
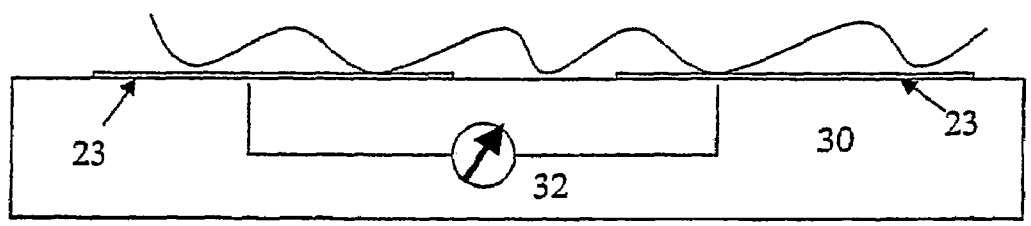
FIG. 14 Shows electrodes 23 being used to measure the impedance of the finger as a means to select the appropriate analogue amplification.

According to the invention, the sensor may also be equipped with a device for measuring the impedance of the finger when it is placed onto the sensor, e.g consisting of two or more electrodes 23 situated on the sensor surface (see FIG. 14). This device will be used to measure the impedance (and thereby indirectly the humidity) of the finger so that an appropriate analogue amplification of the sensor signals can be selected, e.g. low amplification for normal fingers, high amplification for dry fingers and high amplification plus inverting capacitors activated for wet fingers. For dry fingers, the gain must preferably be tuned in such a way that shallow valleys are easily distinguished from deep (true) valleys. The impedance sensing can also be used to determine whether it is desired to activate some of the abovementioned features, e.g to choose an optimal voltage on the local electrode or to decide whether the voltage needs to be "toggled" between several signal levels or frequencies.

In much of the preceding discussion it has been implicitly assumed that the sensor is an AC capacitive sensor of the type described in WO 01/94902, WO 01/99036 or WO 01/99035. It must be understood that the principles described also apply to other kinds of capacitive or resistive sensing principles, in particular DC capacitive sensors and the AC capacitive variety described in 2002 1031. However, when changing the sensing principle the voltage levels on the various electrodes have to be modified so that humid valleys or ridges of humid fingers give readings with signal levels resembling those of obtained from dry fingers.

For instance, the sensor may be a DC capacitive sensor where the time to reach a certain voltage is measured, the charging time being representative of the stored charge and hence of the total capacitance between the sensor pad and an outer electrode. In this case the outer electrode may for instance be coupled to ground, and the sensing capacitor may be charged from the readout electronics by an internal voltage of 5 V during charging time measurements. In this case, the local electrode 2 should e.g be coupled to 5 V (directly or through an impedance 13). When a sweat-filled valley is present the capacitor will now be charged "from both sides" (both from within the readout electronics and from the clamping electrode). The charging time will therefore be shortened, a situation resembling the situation where an air-filled valley is present above the pad and where the capacitance to ground through the finger is close to zero. So also in this case a valley will be "white" or light grey regardless of it being dry or wet. When a ridge is present the charging path from the clamping electrode will be surpressed by the higher impedance through the ridge, and a longer chart time, being typical of a ridge, will result. Likewise, an "inverted" voltage (to be used at the clamping rail) will in this case correspond and to e.g. −5 V DC.

Finally, the described principles can be used for both scanners and matrix type sensors. For matrix type sensor, the principle can most efficiently be used if the area of the individual sensor elements is decreased, so that there is room for the local and (if needed) inner electrodes between two adjacent sensor elements. The outer electrode may in this case for instance be situated outside the matrix area. It should here be noted that the clamping principle requires a thickness of a possible dielectric covering being much less than the dielectric covering the sensor elements in order to provide the necessary "short-circuiting" effect.

Practical implementation

Figure 11:
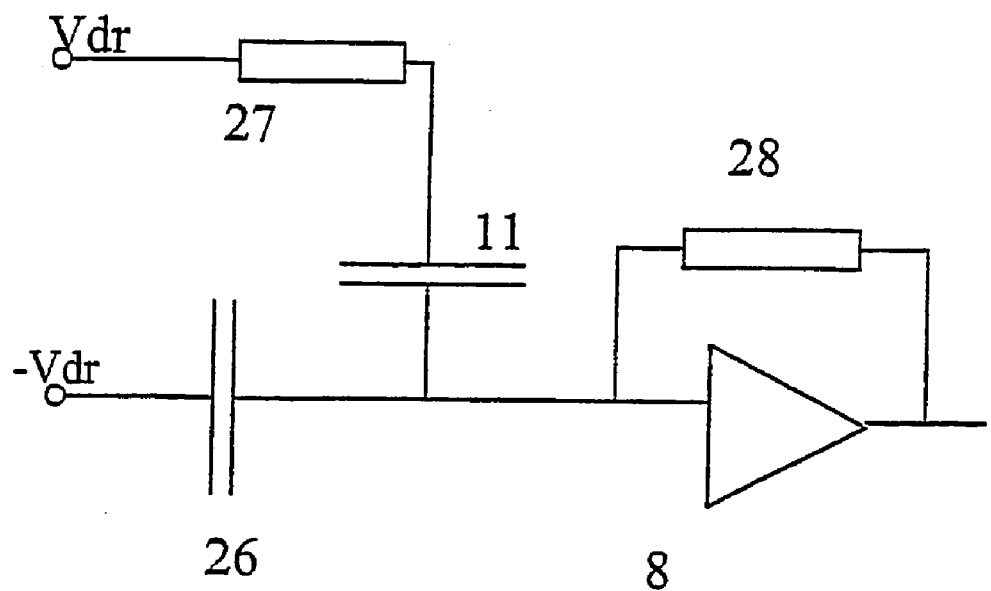
FIG. 11 Illustrates a measurement system schematic showing the "measuring capacitance" 11, the capacitance 26 for "inverting" the signal and the programmable feedback impedance 28 to modify the gain of the amplifier 29.

There are several ways that the invention may be embodied in practice. Some of the suggested elements can be implemented in the functional layer of the ASIC, and the others can fabricated e.g on top of a flat sensor structure. FIG. 11 shows a possible embodiment of the invention, with one outer drive or stimulus electrode 1 and one local drive electrode 2 located near the line of sensor pads 3, where the outer and local electrodes are fabricated on the sensor surface itself. FIG. 2 shows a more detailed view of the area around the sensor pads and local electrode.

The sensor surface may for instance be the top surface of an integrated circuit made in a semiconductor material as in patent application WO 01/99036. It may also have the form of a substrate made of ceramics, glass, silicon or laminates as in patent application WO 01/99035. Here the sensor has the form of a substrate with vias that connect the sensor elements (top side of substrate) to the input pads of an electronical circuit with amplifying circuitry on the ASIC.

The local and source electrodes can be made by patterning for instance the top conductive layer on the substrate using well-known techniques (thinfilm, thickfilm, etc). If located directly on the sensor surface, the electrodes are preferably fabricated in a process compatible with the type of sensor surface used (e.g thin film technology, thick film technology or circuit board technology).

Both the local electrode 2 and the drive electrode 1 may for instance be divided in a number of sub-electrodes that are not interconnected so that they can be operated independently. There may for instance be one or two local electrodes associated with each individual sensor element, so that the humidity around one element does not affect the reading on elements in other parts of the sensor surface.

The impedance network or networks 13 may either be integrated directly on the sensor (including e.g capacitances and/or resistors defined in a thin-film process), be integrated in the readout electronics ("ASIC") or be realized by use of external, discrete components.

Another versatile way of achieving the desired impedance is to cover the local electrode 2 with a thin dielectric (or highly resistive) material whose top surface is directly exposed to the finger. If the local electrode 2 is now for instance coupled to ground, the impedance 13 from the finger surface above the clamping electrode to ground will then be approximately proportional to the contact area between the electrode and the finger around the individual sensor pad, which will give a very "localized" clamping effect. This will be desirable to make the clamping effect for an individual sensor element independent on the effect for other elements.

The electrodes 1 and 2 may thus either be exposed and have an ohmic contact with the finger, or they may be completely covered with an isolating dielectric material to yield a pure capacitive coupling. It may also be advantageous to cover some parts of the electrodes, or of only one of the electrodes, with dielectric and leave the rest open. If the part of the outer electrode 1 being closest to the local electrode 2 for instance is covered with an dielectric, this will reduce the possibility of a direct, low impedance coupling between the two electrodes.

It may be an advantage to maximize the distance between the two electrodes (drive and local) to minimize the direct coupling between the two when sweat is present on the sensor surface. A recommended minimum distance may for instance be in the order of 200-500 µm.

Another possibility may be to cover the complete outer electrode 1 with a thin dielectric and leave at least a part of the local electrode 2 unpassivated. Because of the dielectric passivation there will now always be a minimum, current-delimiting impedance between the two electrodes. This makes it possible to couple the partly exposed local electrode directly to ground without risking excessive current to flow between the electrodes.

If the local electrode is exposed and coupled to ground (or any other DC potential), this will be advantageous from an ESD point of view, as a discharge from the finger is most likely to flow directly to the grounded, local electrode.

If the capacitance detection principle is phase-sensitive it may be an advantage to tailor the impedance network 13 so that the phase of the signal on the local electrode has a certain phase relative to the signal to be detected. If the system is tailored so that the two are 90 degrees out of phase, it may be possible to reduce the effect of the direct coupling between the drive electrode and the local electrode.

It may also be possible to use a drive ring AC signal with several frequencies, of which only some frequency components are present in the signal of the local electrode. If one image is derived from each frequency, it may then be possible to simultaneously obtain different kind of images with different degrees of clamping.

A topological pattern 24 on the sensor surface can be fabricated in various ways depending on its desired shape. Conductive structures (ridges, pads) may be made by patterning metal which is deposited onto the surface. Non-conductive structures may be made by patterning an isolating material or by covering a conductive structure with an isolating layer. The desired topography can be realized by depositing and patterning several layers in a planar process to make a "stairway structure".

If half-sphere formed structures are desired, one solution is to electroplate a reflowable metal ("solder") and to subsequently reflow it on the sensor pad, which must be "solderable" and limited by a nonsolderable material. Direct electroplating or electroless plating of a metal "bump" is another solution. The capacitors used for inverting the signal can e.g be made in a two layer planar thin-film or thickfilm process on either side of the substrate, where a pattern in the top conductive layer constitutes the top plates (connected to the inverted voltage drive circuit) and a matching pattern in the bottom conductive layer constitutes the bottom plates of the capacitors, to be coupled to the sensor pads e.g by wiring in this conductive layer. Alternatively these capacitors can be fabricated on the ASIC circuit.

The finger impedance sensing device can be fabricated by patterning the top conductive layer of the substrate, as described above. The impedance can be measured in a per se known way by means of a voltage sensor 32.

Gain adjustment can be carried out on the ASIC by a combination of switches and feedback impedances in a amplifying circuit. The logic for determining the gain factor can e.g. based on finger impedance measurements and/or preceding sensor rings and can be realized in hardware on the ASIC or on an processor coupled to the sensor.

Other details related to the constructive features of this invention is described in the abovementioned international applications No WO 01/99035, WO 01/99036 and WO 01/94902 and are thus regarded as enclosed in this description.

The invention claimed is:

1. A fingerprint sensor device for performing measurements on an at least partially conductive surface, the sensor comprising a number of conductive structures at or directly below the sensor surface, said conductive structures consisting of at least one stimulation or current sink electrode and a number of sensor elements coupled to interrogation electrodes in an electronic circuit for measuring impedance between the electrodes and said at least one stimulus electrode, the sensor device also comprising at least one additional clamping electrode being positioned in the vicinity of said sensor elements and being coupled to a chosen AC or DC voltage being significantly different from the voltage of the stimulation or current sink electrode.

2. The fingerprint sensor according to claim 1, wherein the distance between the additional clamping electrode and the sensor elements is less than the distance between the ridges in a fingerprint, preferably in the range of 20-200 µm.

3. The fingerprint sensor according to claim 1, wherein the additional clamping electrode is coupled to the same voltage as the stimulus electrode.

4. The fingerprint sensor according to claim 1, wherein the additional clamping electrode is coupled to a voltage supply providing a varying voltage, and said stimulation electrode providing a varying voltage or current to the surface, said varying clamping voltage having an opposite phase relative to the stimulation signal.

5. The fingerprint sensor according to claim 1, wherein the conductive structures are positioned on the sensor surface, thus to obtain direct contact with the at least partially conductive surface.

6. The fingerprint sensor according to claim 1, wherein the conductive structures are partly or completely covered by a dielectric material.

7. The fingerprint sensor according to claim 1, where the sensor elements are constituted by conductive pads on the sensor surface, each of said pads being capacitive coupled to another pad, said pads being connected to interrogation electrodes in an electronic circuit.

8. The fingerprint sensor according to claim 7, where the sensor element pads are not plane, but have topological features for improving contact with the structures on the partially conductive surface.

9. The fingerprint sensor according to claim 7, where the sensor element pads are covered with a dielectric material.

10. The fingerprint sensor according to claim 1, where a part of the conductor tracks between the interrogation electrodes and the sensor pads are capacitively coupled to an electrode, where an AC voltage can be applied to the electrode to partially compensate for the AC signal flowing from finger to sensor element.

11. The fingerprint sensor according to claim 1, where the local electrode is located between the stimulus electrode and the sensor elements.

12. The fingerprint sensor according to claim 1, where the stimulus electrode is located between the additional clamping electrode and the sensor elements.

13. The fingerprint sensor according to claim 12, where the stimulus electrode surrounds a clamping electrode.

14. The fingerprint sensor according to claim 1, where the sensor is an AC capacitive fingerprint sensor.

15. The fingerprint sensor according to claim 1, where the sensor is a DC capacitive fingerprint sensor.

16. The fingerprint sensor according to claim 1, wherein the sensor is provided with one or more ridges or other topological features having heights in the range of 0.5-20 µm placed between the local electrode and the sensor elements.

17. The fingerprint sensor according to claim 1, wherein the various electrodes are adapted to be turned active or inactive depending on certain measured features of the fingerprint.

18. The fingerprint sensor according to claim 1, where the stimulus or additional electrodes are coupled to an AC voltage supply delivering a signal at several frequencies.

19. The fingerprint sensor according to claim 1 is used for detecting or compensating for humidity variations in the partially conductive surface.

20. The fingerprint sensor according to claim 5, where a part of the tracks between the interrogation electrodes and the sensor pads are capacitively coupled to an electrode, where an AC voltage can be applied to the electrode to partially compensate for the AC signal flowing from finger to sensor element.

* * * * *